US008763238B2

(12) United States Patent
Vestergaard et al.

(10) Patent No.: US 8,763,238 B2

(45) Date of Patent: Jul. 1, 2014

(54) METHOD OF MANUFACTURING A COMPONENT FOR A HEARING AID

(75) Inventors: Jorn Eiler Vestergaard, Helsinge (DK); Jorgen Mejner Olsen, Hillerod (DK); Leif Hojslet Christensen, Roskilde (DK); Kenneth Brian Haugshoj, Taastrup (DK); Martin Frohling Jensen, Nastved (DK); Kasper Vestentoft, Copenhagen (DK)

(73) Assignee: Widex A/S, Lynge (DK)

( * ) Notice: Subject to any disclaimer, the term of this patent is extended or adjusted under 35 U.S.C. 154(b) by 538 days.

(21) Appl. No.: 12/496,234

(22) Filed: Jul. 1, 2009

(65) Prior Publication Data

US 2009/0262966 A1 Oct. 22, 2009

Related U.S. Application Data

(63) Continuation-in-part of application No. PCT/DK2007/000002, filed on Jan. 3, 2007.

(51) Int. Cl.
*B23P 19/00* (2006.01)

(52) U.S. Cl.
USPC .............. 29/739; 29/592.1; 29/729; 181/171; 181/172; 381/348; 381/369; 381/396; 381/398

(58) Field of Classification Search
USPC ........... 29/592.1, 594, 602.1, 609.1; 181/171, 181/172; 367/140, 141, 170, 171, 181; 381/173–175, 348, 369, 396, 398
See application file for complete search history.

(56) References Cited

U.S. PATENT DOCUMENTS

| | | | | |
|---|---|---|---|---|
| 3,354,022 | A | 11/1967 | Dettre et al. | |
| 5,530,763 | A | 6/1996 | Aebi et al. | |
| 5,864,628 | A | 1/1999 | Posen et al. | |
| 6,493,454 | B1 * | 12/2002 | Loi et al. | 381/328 |
| 6,859,542 | B2 | 2/2005 | Johannsen et al. | |
| 7,191,029 | B2 * | 3/2007 | Marxen et al. | 700/118 |
| 7,313,245 | B1 | 12/2007 | Shennib | |
| 2004/0213904 | A1 | 10/2004 | Muller et al. | |
| 2005/0141738 | A1 | 6/2005 | Karamuk | |
| 2006/0147071 | A1 | 7/2006 | Neilson | |
| 2009/0154747 | A1 | 6/2009 | Vestergaard | |

FOREIGN PATENT DOCUMENTS

| | | | |
|---|---|---|---|
| DE | 102004062279 | A1 | 5/2006 |
| EP | 1432285 | A2 | 6/2004 |
| EP | 1458217 | A2 | 9/2004 |

(Continued)

OTHER PUBLICATIONS

JP Office Action for JP2009543343 dated Nov. 18, 2011 with English Translation.

(Continued)

*Primary Examiner* — Paul D Kim

(74) *Attorney, Agent, or Firm* — Sughrue Mion, PLLC

(57) ABSTRACT

A hearing aid (8) comprises an inlet port (6), a sound tube (12) for conveying sound to the ear piece (13). The invention further provides a component for a hearing aid comprising a slab (26) having an exterior surface, which is super-hydrophobic. The component may be any one of a housing, a casing, a shell, a faceplate, a grid, a hook, a lid, a battery drawer, a button, or a manipulator. The invention also provides a method of manufacturing a component for a hearing aid.

11 Claims, 4 Drawing Sheets

(56) References Cited

FOREIGN PATENT DOCUMENTS

| | | | |
|---|---|---|---|
| JP | 8163699 | A | 6/1996 |
| JP | 09215099 | | 8/1997 |
| JP | 200158157 | A | 6/2000 |
| JP | 2003236847 | A | 8/2003 |
| JP | 2003236895 | A | 8/2003 |
| JP | 2006144029 | A | 6/2006 |
| WO | 0003561 | | 1/2000 |
| WO | 0058415 | | 10/2000 |
| WO | 2004073351 | A1 | 8/2004 |
| WO | 2005039234 | A2 | 4/2005 |
| WO | 2005051040 | A1 | 6/2005 |
| WO | 2005079373 | A2 | 9/2005 |
| WO | 2007005852 | A2 | 1/2007 |

OTHER PUBLICATIONS

JP Office Action for JP2009543343 dated Apr. 17, 2012 with English translation.

JP Office Action for JP2009524899 dated Mar. 13, 2012 with English Translation.

* cited by examiner

METHOD OF MANUFACTURING A COMPONENT FOR A HEARING AID

RELATED APPLICATIONS

The present application is a continuation-in-part of application no. PCT/DK2007000002 filed on Jan. 3, 2007, and published as WO-A1-2008080397, the contents of which are incorporated herein by reference.

BACKGROUND OF THE INVENTION

1. Field of the Invention

The present invention relates to components for hearing aids. The invention further relates to a method for manufacturing a component for a hearing aid.

2. The Prior Art

Hearing aids generally include a range of components such as housing, internal electronic circuitry, lid, switches and buttons.

ITE hearings aids generally comprise a shell, which anatomically duplicates the relevant part of the user's ear canal. A receiver is placed in the shell in communication with an acoustic outlet port arranged at the proximal end, i.e. the end of the shell adapted for being situated in the ear canal close to the tympanic membrane. The distal end of the shell, i.e. the opposite end, intended to be oriented towards the surroundings, is closed by a faceplate subassembly, connected to the receiver by leads. In one design, the faceplate subassembly incorporates a microphone, electronics, a battery compartment and a hinged lid. The microphone communicates with the exterior through a port, which may covered by a grid.

Whereas an ITE hearing aid may be regarded as an earpiece integrating all parts of a hearing aid, a BTE hearing aid comprises a housing adapted for resting over the pinna of the user and an ear piece adapted for insertion into the ear canal of the user and serving to convey the desired acoustic output into the ear canal. The earpiece is connected to the BTE housing by a sound conduit or, in case it houses the receiver, by electric leads. In either case it has an output port for conveying the sound output.

During normal use, a hearing aid is exposed to environmental factors such as wear, moisture, sweat, ear wax, fungi, bacteria, dirt and water. Some of those factors may have a corroding influence; others may cause development of an undesired biofilm or of an otherwise irregular surface patina. Corrosion may be controlled by the selection of durable materials. However the environmental factors may over time create an unsightly appearance.

WO-A1-00/03561 provides an in-the-ear hearing aid wherein the acoustic outlet port is protected against contamination by earwax by means of an earwax guard, which is inserted in port. An elastic hose connects the port to a receiver. The earwax guard comprises an essentially tubular element with a through-going cavity and an abutment collar in one end for sealing abutment against an edge of the hearing aid housing adjacent the port.

EP-A2-1432285 shows a method for hydrophobic coating of components for a hearing aid in areas of gaps, slits and apertures, such as for the battery lid, the battery compartment, the housing or a switch, for the purpose of ensuring entry of oxygen, which is needed for proper operation of Zn-air batteries, while controlling the entry of liquids. The coating comprises hydrophobic or oleophobic materials applied through immersion or spraying.

DE-A1-102004062279 shows an earwax guard for a hearing aid, which has been provided with an oleophobic or biofilm-inhibiting coating.

EP-A2-1458217 shows an acoustic filter of a hearing instrument, detachably placed nearby or at the opening for the acoustic output of the instrument. The filtering element is made of a polymer material, a synthetic, metallic or ceramic material or a fabric-like material.

EP-A2-1432285 provides a method for hydrophobic coating of a hearing aid for the purpose of preventing entry of moisture into crevices and openings of the housing.

U.S. Pat. No. 3,354,022 provides a water-repellant surface having high and low portions with an average distance between high portions of not more than 1000 microns and an average height of high portions of at least 0.5 times the average distance between them; and having an air content of at least 60%. The air content of the surface is determined by taking an imaginary plane parallel to the surface passing through the tops of the high portions of the surface and measuring at this plane the percentage of the total surface area that is air. The surfaces may be coated with a solid having a water contact angle of greater than 90 degrees. These surfaces are highly water repellant.

WO-A1-0058415 provides a device for the loss-free transport or emptying of hydrophilic liquids, which device has raised areas and cavities on the side facing the liquid, the distance between the raised areas being between 0.1 and 200 microns and the height of said raised areas between 0.1 and 100 microns, and the raised areas being hydrophobic.

SUMMARY OF THE INVENTION

The invention, in a first aspect, provides a component for a hearing aid comprising a slab with an exterior surface, wherein the exterior surface is microstructured and surface coated by molecular vapor deposition with a moisture repellant matter, and wherein the exterior surface has an air content of at least 50%.

This provides a component for a hearing aid that has enhanced repellency to moisture and bodily fluids. Components on which this surface would be advantageous comprise housings, casings, shells, faceplates, grids, hooks, lids, battery drawers, buttons and manipulators etc. Suitable substances for the coatings are silanes such as perfluoroalkylsilanes or alkylsilanes. The silanes are chemically attached to the surface by reaction between hydroxy groups on the silane and on the surface, forming a self assembled monolayer (SAM).

According to an embodiment, the component comprises a slab with an exterior surface that has been microstructured. The inventors have discovered that microstructuring of the surface enhances the water repellant properties. The term exterior surface is here used to designate a surface intended for generally facing the environment exterior to the hearing aid, as opposed to a surface intended to face inner parts of the hearing aid.

Further advantageous features appear from the dependent components claims.

The invention, in a second aspect, provides a method of manufacturing a component for a hearing aid, comprising providing a slab with a microstructured surface, which surface has an air content of at least 50%, and treating the microstructured surface with a moisture repellant matter.

This provides a method for manufacturing of components with superior properties with respect to repellency to water and bodily fluids. Components on which this method is of advantage include housings, casings, shells, faceplates, grids, hooks, lids, battery drawers, buttons and manipulators, etc.

The invention, in a third aspect, provides a method of manufacturing a component for a hearing aid, comprising providing a slab with a microstructured surface, and treating the microstructured surface with a moisture repellant matter.

Within the present context surfaces exhibiting a contact angle to water exceeding 120° are termed super-hydrophobic. Suitable surfaces may be produced by selecting appropriate materials and providing a micro-surface structure with high air content.

Still other features and advantages of the present invention will become apparent to those skilled in the art from the following description wherein the invention will be explained in greater detail.

BRIEF DESCRIPTION OF THE DRAWINGS

By way of example, there is shown and described a preferred embodiment of this invention. As will be realized, the invention is capable of other different embodiments, and its several details are capable of modification in various, obvious aspects all without departing from the invention. Accordingly, the drawings and descriptions will be regarded as illustrative in nature and not as restrictive. In the drawings.

DETAILED DESCRIPTION OF THE INVENTION

Figure 1:
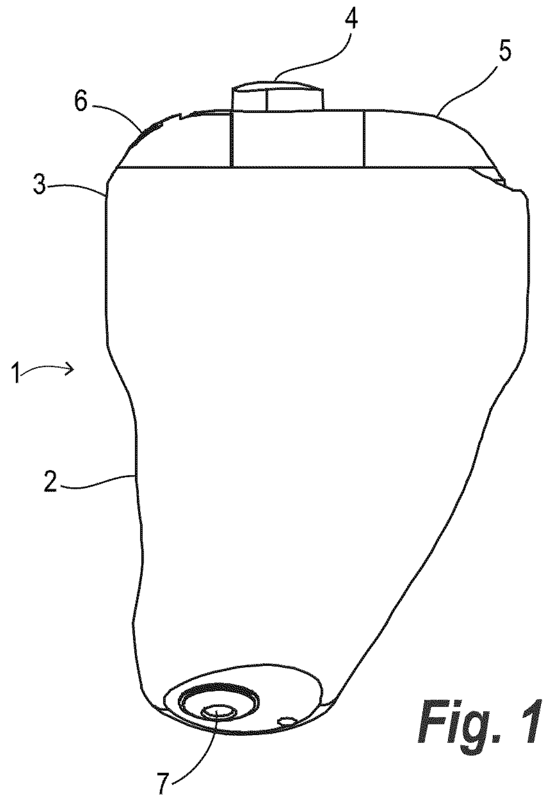
FIG. 1 shows an ITE hearing aid.

Reference is first made to FIG. 1, which illustrates an ITE hearing aid 1, generally comprising a shell 2, a faceplate 3, a lid 5, a sound inlet port 6 and a sound output port 7. The hearing aid 1 is adapted to be positioned in the auditory canal of a user with the sound output port 7 facing the user's tympanic membrane. FIG. 1 also shows a push button 4 arranged in the lid. The push button serves to allow the user to input commands, e.g. stepping through different programs to enter a selected one.

Figure 2:
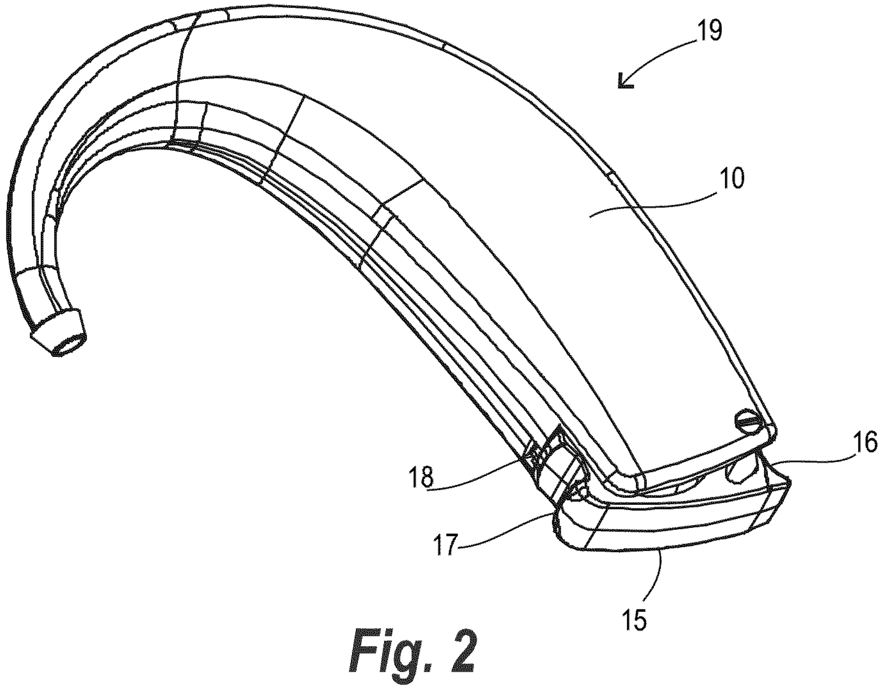
FIG. 2 shows a BTE hearing aid according to a first embodiment, in perspective.

FIG. 2 shows a BTE hearing aid 19 according to a first embodiment, this embodiment being essentially styled with hook and casing in one integral piece. This embodiment also has battery drawer 15 with battery drawer protrusion 16, and battery drawer nose 17. The FIG. 2 embodiment features a lock gripping portion 18, which is a manipulator that must be engaged by the tip of a nail or a pencil to permit opening the drawer for removal of the battery. For further details about these details reference may be had to WO-A1-2004073351, the contents of which are incorporated hereinto by reference.

Figure 3:
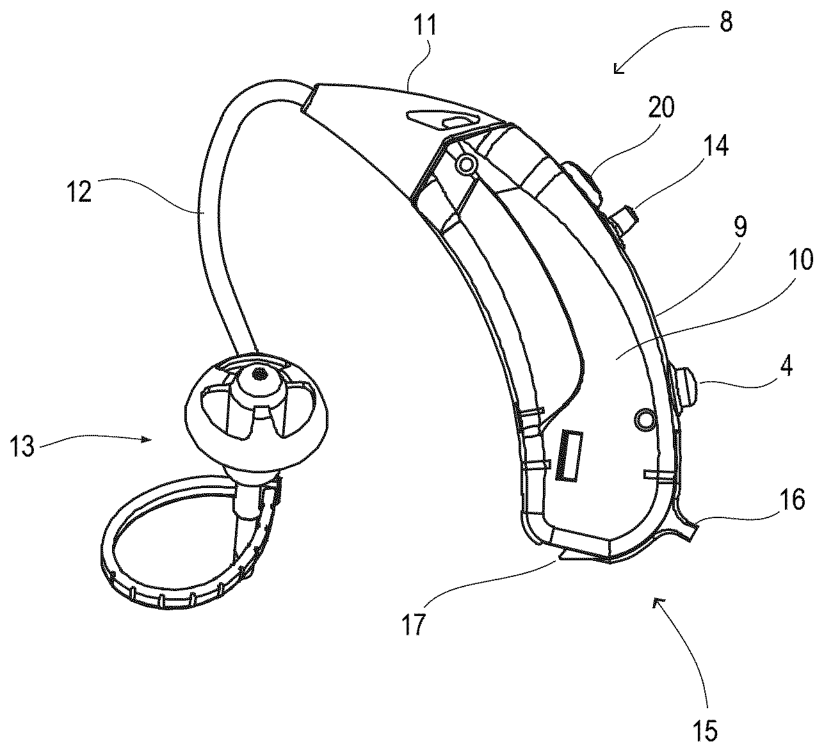
FIG. 3 shows a BTE hearing aid according to a second embodiment.
Figure 4:
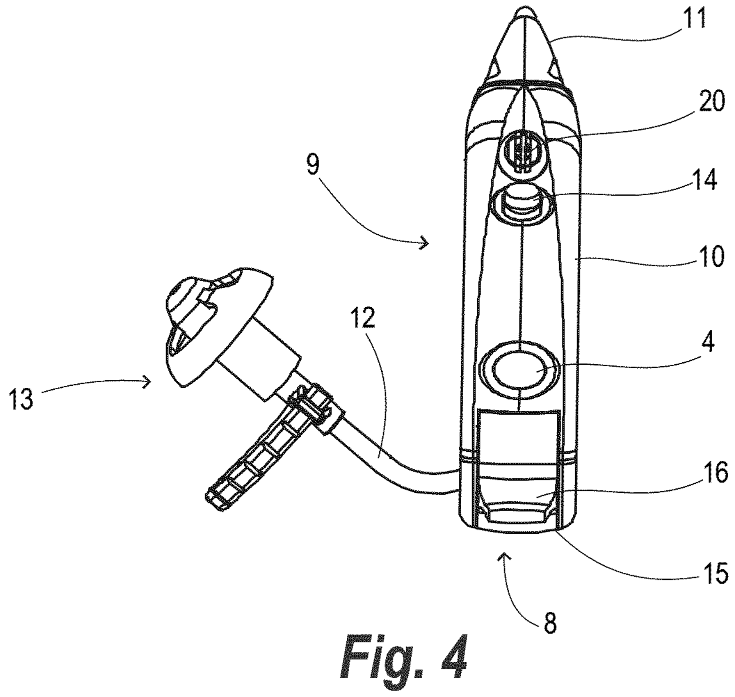
FIG. 4 shows the BTE hearing aid of FIG. 3 in rear view.

Reference is now made to FIG. 3 and FIG. 4 for an explanation of a BTE hearing aid according to a second embodiment according to the invention.

FIG. 3 illustrates a BTE hearing aid 8 according to the second embodiment, in side view. This hearing aid 8 comprises BTE housing 9, generally consisting of casing 10, hook 11, sound tube 12 and ear piece 13. The hearing aid has various details such as microphone grid 20, rocker button 14, battery drawer 15, battery drawer protrusion 16, and battery drawer nose 17. The rocker button is used for permitting the user to turn up or down the volume. The battery drawer may be partially opened by engaging the protrusion 16 for switching off the hearing aid, and closed to switch on the hearing aid again. The battery drawer may also be fully opened for removing the battery by engaging the nose 17. For a further explanation about these details reference may be had to WO-A1-2004073351.

FIG. 4 shows the BTE hearing aid of FIG. 3 in rear view. Reference may be had to the explanation given in relation to FIG. 3.

According to the invention, components of the hearing aids may be treated to achieve enhanced surface properties. Components where this can be used to advantage comprise housings, casings, shells, faceplates, grids, hooks, lids, battery drawers, buttons and manipulators. In the present context the expression enhanced surface properties towards aqueous and oily substances signifies an improved ability of the surface to repel such substances. Generally, the ability of a solid surface to repel a liquid substance can be determined in terms of wetting.

Figure 5:
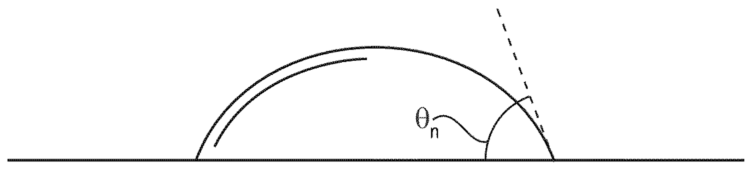
FIG. 5 shows a section of a droplet on a surface exhibiting a small contact angle.

One quantitative measure of the wetting of a solid by a liquid is the contact angle, which is defined geometrically as the internal angle formed by a liquid at the three-phase boundary where the liquid, gas and solid intersect. This is illustrated in FIG. 5, where $\theta_n$, denotes the contact angle of a water droplet on a normal untreated surface and in FIG. 6, where $\theta_m$ denotes the contact angle of a water droplet on a modified surface.

Contact angle values below 90° indicate that the liquid spreads out over the solid surface in which case the liquid is said to wet the solid. If the contact angle is greater than 90° the liquid instead tends to form droplets on the solid surface and is said to exhibit a non-wetting behavior.

In this terminology it follows that the larger the contact angle, the better the ability of a surface to repel a respective substance. As indicated in FIG. 5, for untreated surfaces the contact angle is normally less than 90°. It is well known in the art to coat a solid with a hydrophobic layer in order to increase the contact angle and thereby obtain a moisture repellent surface. Such a surface coating may typically increase the contact angle of water to around 115-120°.

Figure 6:
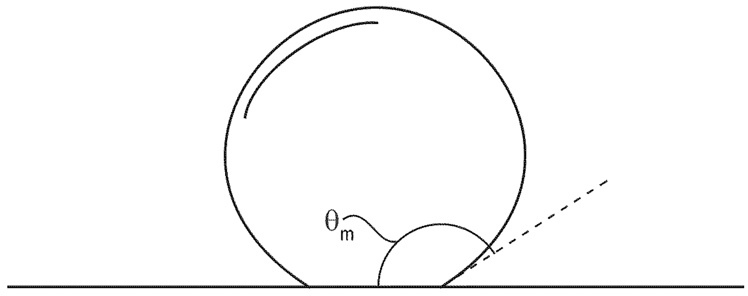
FIG. 6 shows a section of a droplet on a surface exhibiting a large contact angle.

Applicants have discovered that a structural modification of the surface of certain materials will improve the ability of the material to repel aqueous and oily substances. The applicants have further discovered that the combination of structural modification and coating significantly improves barrier properties of the surface. FIG. 6 shows a water droplet on a surface, which has been modified according to the invention. The increased contact angle largely exceeds 90°. In fact, as documented below, when the surface is modified by a combination of a structuring and a coating, the contact angle of water exceeds 145° for a variety of materials. The obtained surface characteristics may be termed super-hydrophobic. In addition to the super-hydrophobic surface characteristics, the modified materials obtained super-oleophobic surface characteristics, as will also become clear in the following.

Figure 7:
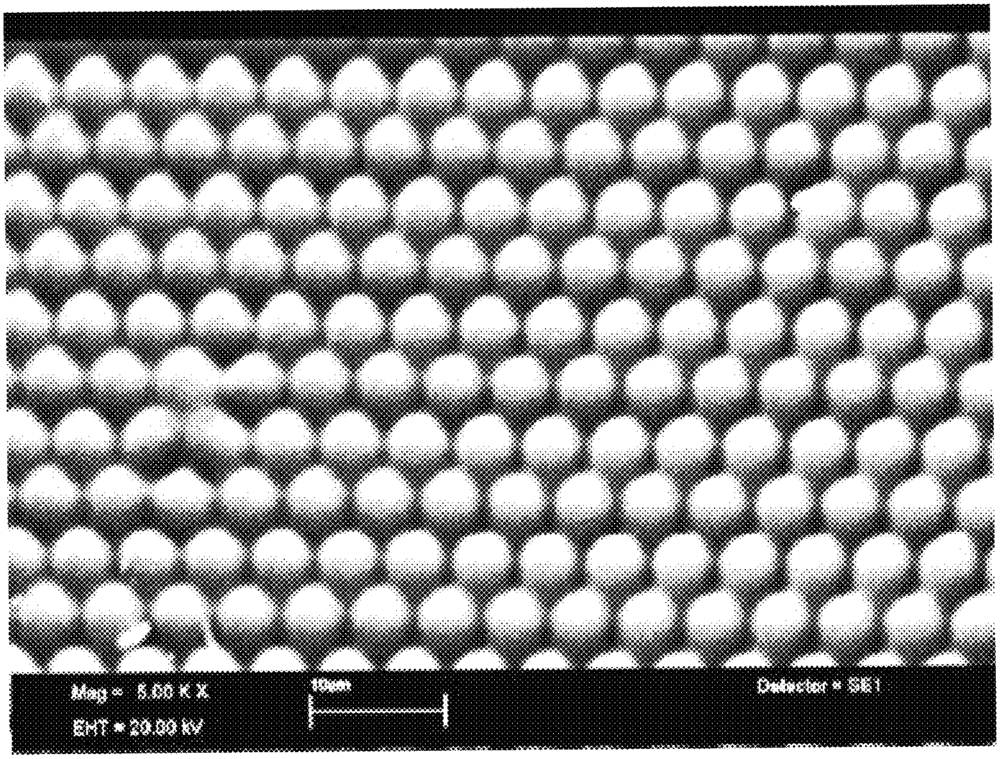
FIG. 7 shows a plan view of a slab for a component according to an embodiment of the invention.

The component surface modification will now be described in more detail beginning with the surface structuring. FIG. 7 shows an example of a laser structured surface of a slab for a component according to the invention as seen through a microscope. This slab may represent a part of a component of a hearing aid, e.g. a part of a housing, a casing, a shell, a faceplate, a grid, a hook, a lid, a battery drawer, a button, or a manipulator, etc.

The surface structuring is preferably realized on lateral scales that are much larger than characteristic sizes for atoms and molecules as well as for grains or other sub-nanometer structures, but not larger than 1000 microns. This is referred to as a microstructure.

The structuring and/or coating can be applied to the entire component surface or it can be applied to a part of it. A controlled structuring of at least a part of the surface in the immediate vicinity of the pores is particularly advantageous.

The applied structure can be periodic, quasi-periodic or random within a certain spatial bandwidth. The spatial bandwidth is defined as the range of reciprocal wave numbers of the lateral scales of the structure, the wave number being defined as the reciprocal value of the lateral wavelength of a periodic structure. The structure is applied to at least a part of the component surface. The average pitch in the surface structure should be 1000 microns or lower. The aspect ratio is typically about 1:1 or larger. Good results have been obtained with samples over a broad pitch range, including pitch at 40 microns, 10 microns and 5 microns. Thus, the exterior surface can have a microstructure with an average pitch in the range from 5 microns to 1000 microns, preferably in the range of 5 microns to 50 microns.

The surface structuring may be performed by a number of methods, for example by laser processing of the surface with thermal or non-thermal interactions. Non-limiting examples of lasers that can be used for surface structuring are $CO_2$ lasers, solid state lasers, such as Nd:YAG, picosecond lasers and femtosecond lasers. Processes used in the fabrication of micro/nano-electronics or micro/nano-electromechanical systems as well as other etching or electrochemical processes can also be applied.

For a number of components of the hearing aid, e.g. housings, casings, shells, faceplates, grids, hooks, lids, battery drawers, buttons and manipulators, it is generally preferred to manufacture them by injection molding. In this case structuring of the component surface may be achieved through suitable structuring of an inner surface of the die used, e.g. by laser drilling, etching, or spark treatment. In case of components manufactured by an SLA technique, sometimes referred to as a rapid prototyping method, it is generally preferred to provide microstructuring of the component surface subsequent to the molding, e.g. by laser processing, etching or electrochemical processing.

The coating of the surface structured component will now be described. The coating may be applied using a gas phase nano-coating process. The process is based on applying a hydrophobic coating to a surface using silanes such as perfluoroalkylsilanes or alkylsilanes. The silanes are chemically attached to the surface by reaction between hydroxy groups on the silane and on the surface, forming a self-assembled monolayer.

Firstly, the material to be coated is rendered active by treatment with a plasma, e.g. an oxygen plasma. The plasma treatment both acts as a cleaning of the surface and as a way of making the surface reactive by the introduction of hydroxy groups into the surface.

Preferably, an adhesion layer that further enhances the reactivity of the surface by creating even more hydroxy groups may then be deposited and, more preferred, a catalyst is added to promote deposition of the adhesion layer. This step is necessary for non-metallic substrates and also for glasses and some metals in order to create stable coatings.

In the last step, a silane is then reacted with the activated surface with or without adhesion layer. Preferably, a catalyst is added to promote deposition of the silane.

Both silane and adhesion layer are preferably deposited using a vapor phase reaction scheme. Preferably, the equipment is designed so as to have a reaction chamber and separate reservoirs containing the different chemistries used (silane, adhesion layer precursor and a catalyst) and a remote plasma source. From each reservoir, well-defined amounts of the different chemistries are evaporated into a vaporization chamber, from where the vapor is injected into the reaction chamber once a specified pressure in the vaporization chamber is reached. The connections between each reservoir and the vaporization chamber and between the vaporization chamber and the reaction chamber are controlled by valves. The reservoirs and the transfer lines may be heated if necessary in order to promote vaporization and to avoid condensation in the transfer lines. Also, the reaction chamber may be heated.

The system is initially pumped so as to keep a low pressure in the reaction chamber, transfer lines and vaporization chamber. Thereafter, the pumping action is halted and the compounds in the reservoirs are allowed to evaporate into the vaporization chamber. Once the pre-set pressure in the vaporization chamber is reached the vapor is injected into the reaction chamber by action of the pressure difference between the vaporization chamber and the reaction chamber. Once a reaction step is completed the reaction chamber, transfer lines and vaporization chamber are pumped down after which a new reaction cycle can start.

Other gas phase deposition schemes may be used, but the setup described above has the advantage that plasma activation, deposition of adhesion layer and deposition of the silane are carried out in the same equipment in an automated fashion, providing no need for user intervention between the individual steps. Furthermore, the precise control over the injected amounts of chemical substances into the reaction chamber and the control over the total pressure in the reaction chamber are advantageous in order to obtain a good quality of the coating both with respect to structure and surface binding.

Alternatively, after plasma activation the process may be performed in liquid solution with the same deposition steps as previously described. The gas phase deposition is, however, the preferred technique, as the liquid phase deposition is more cumbersome and demands several rinse steps.

Also, polymerization of the silane in the liquid phase produces by-products that may only be deposited onto the surface via physical adsorption and not chemical binding, resulting in both low-quality coatings and in irreproducible coating thicknesses.

Figure 8:
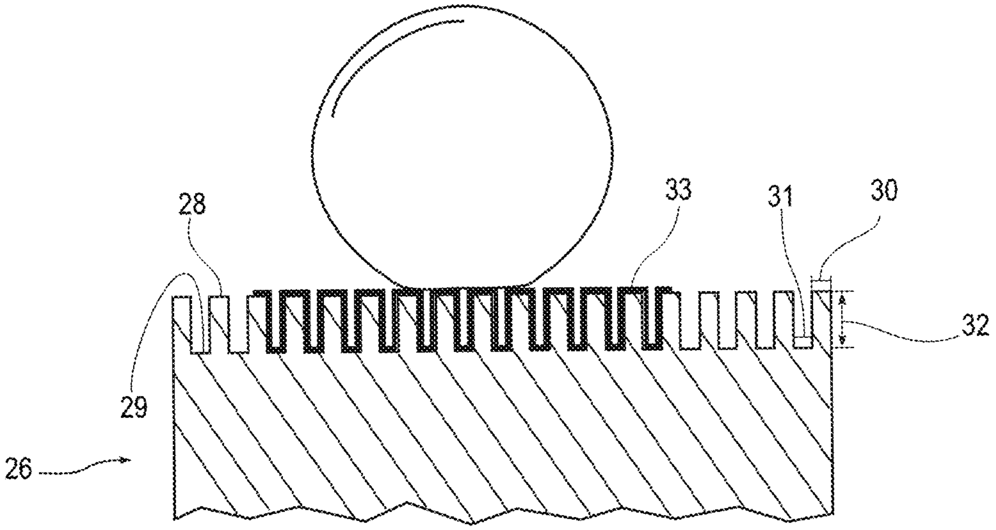
FIG. 8 shows a section in a slab for a component according to another embodiment of the invention.

Reference is made to FIG. 8 for an illustration of a barrier 15 having an exterior surface 16, which is structured and coated according to an embodiment of the invention. The surface is characterized by a square-wave like profile having alternating peaks 28 and troughs 29 which can be described in terms of peak height 32, peak width 30 and trough width 31. A part of the surface is further provided with a coating 33.

The barrier performance has been tested for different materials with different surface structures. A hexagonal pattern of columns on polytetrafluoroethylene (Teflon®) was produced with a femtosecond laser. The column width at the bottom was approximately 40 microns and the spacing about 40 microns. Each column had a microstructure generated by the ablation process, which is non-thermal. This ensures that surface tension does not smooth the surface locally. Typical fill factors are below 50%. The fill factor is defined as the ratio of the amount of material left relative to the amount of material that is removed from the surface layer. The average laser power was 100 mW, the pulse repetition rate was 6 kHz, the optical wavelength was 775 nm, and the pulse width was 150 fs. An increase in contact angle from about 115 degrees to about 150 degrees was observed after the processing, which included the coating.

Equivalent experiments were performed with polyethylene (Stamylex®, available from DEXPlastomers v.o.f, Heerlen, The Netherlands). The average laser power was 50 mW. An even more dramatic change in contact angle was observed. Experiments on stainless steel have also been performed with equivalent results. The average laser power was in this case 275 mW. Experiments on steel with random structures generated in conjunction with the formation of pores of a diameter of 80 microns have produced similar results.

Contact angles obtained for water and olive oil on different surfaces are displayed in the below tables 1 and 2. Olive oil can be regarded as a representative of liquid earwax.

The clean surfaces have undergone oxygen plasma treatment for 5 minutes. The structured surfaces were created by a femtosecond laser with a wavelength of 775 nm and obtained peak heights of 25 microns. The surfaces were coated by molecular vapor deposition.

TABLE 1

Contact angles for water

| Substrate | Clean surface (°) | Laser structured surface (°) | Coated surface (°) | Laser structured and coated surface (°) |
|---|---|---|---|---|
| Steel | 85 ± 5 | 55 ± 5 | 115 ± 5 | 155 ± 5 |
| Glass | 40 ± 5 | 10 ± 5 | 115 ± 5 | 150 ± 5 |
| Polyamide | 70 ± 5 | <15 | 115 ± 5 | 160 ± 5 |
| PET | 80 ± 5 | 125 ± 5 | 115 ± 5 | 150 ± 5 |
| PE (Stamylex) | 90 ± 5 | 125 ± 5 | 115 ± 5 | 160 ± 5 |
| FEP (Teflon ®-like) | 120 ± 5 | 155 ± 5 | 115 ± 5 | 160 ± 5 |

TABLE 2

Contact angles for olive oil

| Substrate | Cleaned surface (°) | Laser structured surface (°) | Coated surface (°) | Laser structured and coated surface (°) |
|---|---|---|---|---|
| Steel | — | — | 80 ± 5 | 105 ± 5 |
| PE (Stamylex) | — | — | 80 ± 5 | 130 ± 5 |

The large relative increase in the contact angles for both water and olive oil indicates that the modified surfaces of the different materials have become super-hydrophobic as well as super-oleophobic.

Materials favored for components such as a housing, a housing, a casing, a shell, a faceplate, a grid, a hook, a lid, a battery drawer, a button, or a manipulator, comprise ABS=Acrylonitrile Butadiene Styrene ABS-PC=Blend of Acrylonitrile Butadiene Styrene and Polycarbonate CAP/CP=Cellulosepropionate MABS=Methyl Methacrylate Acrylonitrile Butadiene Styrene PA=Polyamide PBT=Thermoplastic polyester PC=Polycarbonate PMMA=Poly Methyl Methacrylate POM=Polyoxymethylene, also known as Acetal plastic A test program was conducted on samples of these materials. Slabs were injection molded in polished and in spark-treated dies. The molded slabs subsequently had their surfaces micro-structured by laser treatment and coated. For comparison, a set of slabs injection molded in polished and spark-treated dies was included. The spark treatment was done according to a specification Chamilles 24 as defined by a the company Charmilles Technologies SA, 1217 Meyrin 1, Geneva, Switzerland. Specimens molded in spark-treated dies thus have some microstructuring in the surface. Subsequent structuring by laser treatment of the surfaces introduces a deeper structuring so as to get a surface with an air content at or above 50%, preferably at or above 60%.

The comparison samples were not micro-structured and were not coated. Droplets of water and olive oil were deposited, and the contact angles were measured.

Table 3 shows results of measurements of contact angles with drops of water. Table 4 shows results of tests measurements of contact angles with drops of olive oil, which may be assumed to simulate the properties of liquid earwax.

The slabs were then subjected to an accelerated ageing process, where they were stored for 24 hours in warm water mixed with NaCl and acetic acid. This ageing test emulates the degrading influence of sweat. The measurements after ageing (only micro-structured slabs) are given in tables 5 and 6, table 5 showing measurements with water, and table 6 showing measurements with olive oil.

TABLE 3

Contact angles for water

| | Plain surface | | Laser structured and coated surface | |
|---|---|---|---|---|
| Substrate | polished | sparked | polished | sparked |
| ABS | 116 | 113 | 158 | 157 |
| ABS-PC | 39 | 117 | 157 | 155 |
| CAP-CP | 113 | 119 | 154 | 153 |
| MABS | 122 | 113 | 158 | 158 |
| PA | 116 | 119 | 154 | 158 |
| PBT | 117 | 121 | 155 | 158 |
| PC | 40 | 34 | 154 | 154 |
| PMMA | 32 | 38 | 153 | 154 |
| POM | 113 | 119 | 153 | 155 |

TABLE 4

Contact angles for olive oil

| | Plain surface | | Laser structured and coated surface | |
|---|---|---|---|---|
| Substrate | polished | sparked | polished | sparked |
| ABS | 85 | 79 | 141 | 140 |
| ABS-PC | 74 | 82 | 139 | 140 |
| CAP-CP | 75 | 81 | 135 | 139 |
| MABS | 81 | 82 | 143 | 141 |
| PA | 84 | 83 | 139 | 134 |
| PBT | 85 | 84 | 138 | 137 |
| PC | 84 | 70 | 127 | 137 |
| PMMA | 64 | 33 | 137 | 137 |
| POM | 83 | 86 | 138 | 141 |

TABLE 5

Contact angles for water, after ageing

| Substrate | Plain surface polished | Plain surface sparked | Laser structured and coated surface polished | Laser structured and coated surface sparked |
|---|---|---|---|---|
| ABS | NA | NA | 158 | 150 |
| ABS-PC | NA | NA | 157 | 164 |
| CAP-CP | NA | NA | 88 | N.A. |
| MABS | NA | NA | 158 | 159 |
| PA | NA | NA | 157 | 160 |
| PBT | NA | NA | 158 | 157 |
| PC | NA | NA | 156 | 157 |
| PMMA | NA | NA | 159 | 153 |
| POM | NA | NA | 157 | 160 |

TABLE 6

Contact angles for olive oil, after ageing

| Substrate | Plain surface polished | Plain surface sparked | Laser structured and coated surface polished | Laser structured and coated surface sparked |
|---|---|---|---|---|
| ABS | NA | NA | 144 | 94 |
| ABS-PC | NA | NA | 140 | 141 |
| CAP-CP | NA | NA | 23 | N.A. |
| MABS | NA | NA | 141 | 142 |
| PA | NA | NA | 133 | 140 |
| PBT | NA | NA | 139 | 129 |
| PC | NA | NA | 146 | 145 |
| PMMA | NA | NA | 143 | 122 |
| POM | NA | NA | 139 | 134 |

This was found to be a very satisfactory result. There is a significant enhancement of repellency to water and to olive oil. The enhanced properties are persistent after ageing.

The invention claimed is:

1. A method of manufacturing a component for a hearing aid, comprising providing a slab with a microstructured surface having no through-going perforations, which surface has an air content of at least 50%, and treating the microstructured surface with a moisture repellant matter, wherein said component is one of a housing, a casing, a shell, a faceplate, a hook, a battery drawer, a button, or a manipulator.

2. The method according to claim 1, wherein the step of providing the slab with the microstructured surface comprises injection molding in a die, which die has been microstructured at an inside.

3. The method according to claim 2, wherein the microstructuring of the die inside has been achieved by one of laser drilling, etching, or spark treatment.

4. The method according to claim 1, wherein the step of providing the slab with the microstructured surface comprises processing of the surface with a laser selected from the group consisting of a $CO_2$ laser, a solid state laser, a picosecond laser and a femtosecond laser.

5. The method according to claim 1, wherein the step of providing the slab with the microstructured surface comprises manufacturing a blank by an SLA technique, and subsequently providing microstructuring of the blank surface by a method selected from the group consisting of laser processing, etching and electrochemical processing.

6. The method according to claim 1, wherein the step of treating the microstructured surface with a moisture repellant matter comprises gas phase deposition using a silane, preferably a perfluoroalkylsilane or an alkylsilane.

7. The method according to claim 1, wherein the exterior surface has a microstructure with an average pitch in the range of 5 microns to 50 microns.

8. The method according to claim 1, wherein said treating step comprises molecular vapor deposition.

9. A method of manufacturing a component for a hearing aid, comprising providing a slab with a microstructured surface with no through-going perforations, and treating the microstructured surface with a moisture repellant matter, wherein said component comprises one of a housing, a casing, a shell, a faceplate, a hook, a battery drawer, a button, or a manipulator.

10. The method according to claim 9, wherein the exterior surface has a microstructure with an average pitch in the range of 5 microns to 50 microns.

11. The method according to claim 9, wherein the microstructured surface has an air content of at least 50%.

* * * * *